United States Patent
Petrillo et al.

(10) Patent No.: US 7,453,066 B2
(45) Date of Patent: Nov. 18, 2008

(54) METHOD AND APPARATUS TO RECOVER A DEAD PIXEL IN DIGITAL IMAGING SYSTEMS

(75) Inventors: Michael J. Petrillo, Pleasanton, CA (US); Kim H. Hansen, Bagsvaerd (DK); Thomas Karpati, San Francisco, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 489 days.

(21) Appl. No.: 10/541,562

(22) PCT Filed: Jan. 5, 2004

(86) PCT No.: PCT/IB2004/000011

§ 371 (c)(1),
(2), (4) Date: Nov. 30, 2005

(87) PCT Pub. No.: WO2004/061480

PCT Pub. Date: Jul. 22, 2004

(65) Prior Publication Data

US 2006/0097179 A1    May 11, 2006

Related U.S. Application Data

(60) Provisional application No. 60/438,221, filed on Jan. 6, 2003.

(51) Int. Cl.
*G01T 1/20* (2006.01)
(52) U.S. Cl. .................................. 250/370.11
(58) Field of Classification Search ............ 250/370.11
See application file for complete search history.

(56) References Cited

U.S. PATENT DOCUMENTS

| 5,657,400 | A | 8/1997 | Granfors et al. |
| 5,774,601 | A | 6/1998 | Mahmoodi .................. 382/298 |
| 6,118,846 | A | 9/2000 | Liu |
| 6,296,387 | B1 | 10/2001 | Guillemaud |

(Continued)

FOREIGN PATENT DOCUMENTS

JP    2002330341    11/2002

OTHER PUBLICATIONS

Koren, I., et al.; A Self-Correcting Active Pixel Camera; IEEE; 2000; pp. 56-64.

*Primary Examiner*—Christine Sung

(57) ABSTRACT

Gamma radiation events are received individually at elements of a detector array (18) at least one of the elements (P0) being defective. Each detector element converts incident radiation into a radiation event signal which is digitized by an analog-to-digital converter (42) into a coordinate position (x,y) on the detector array and energy (z). An event generator (48) generates radiation event signals for each defective element based on radiation events received at contributing elements, e.g., nearest neighbor elements (P1-P8). In a preferred embodiment, the contribution from each of the contributing elements is randomized by passing a token (56) among positions of a table (54) corresponding to each of the contributing elements. Each time a radiation event is received at the contributing element whose corresponding table position holds the token, that event also generates an event signal for the defective element and the token is passed (58). The energy of the generated event for the defective detector element is randomized (62), such as by replacing the least significant bits with random numbers.

17 Claims, 3 Drawing Sheets

U.S. PATENT DOCUMENTS

| | | | |
|---|---|---|---|
| 6,529,618 B1 * | 3/2003 | Ohara et al. | 382/132 |
| 6,792,159 B1 * | 9/2004 | Aufrichtig et al. | 382/260 |
| 2002/0080917 A1 | 6/2002 | Granfors et al. | |
| 2002/0139970 A1 | 10/2002 | Iwanczyk et al. | |

* cited by examiner

METHOD AND APPARATUS TO RECOVER A DEAD PIXEL IN DIGITAL IMAGING SYSTEMS

This application claims the benefit of U.S. provisional application Ser. No. 60/438,221 filed Jan. 6, 2003, which is incorporated herein by reference.

The present invention relates to the art of digital imaging. It finds particular application in nuclear cameras, and will be described with particular reference thereto. It is to be appreciated that the present invention is applicable to other pixilated imaging devices, such as astronomy detectors for image faint regions of space. Those skilled in the art will appreciate applicability of the present invention in the applications where presence of dead or degenerative pixels destroys the precision of the methodology.

Diagnostic nuclear imaging is used to study a radionuclide distribution in a subject. Typically, one or more radiophmaceutical or radioisotopes are injected into a subject. The radiopharmaceutical is commonly injected into the subject's bloodstream for imaging the circulatory system or for imaging specific organs, which absorb the injected radiopharmaceutical. A radiation detector is placed adjacent to the surface of the subject to monitor and record emitted radiation. Often, the detector is rotated or indexed around the subject to monitor the emitted radiation from a plurality of directions. These projection data sets are reconstructed into a three-dimensional image representative of the radiopharmaceutical distribution within the subject.

Commonly, each detector head includes an array of photomultiplier tubes (PMTs) facing a large scintillation crystal. Each radiation event generates a corresponding flash of light that is seen by the closest photomultiplier tubes. Each photomultiplier tube that sees an event puts out a corresponding analog pulse. The analog pulses from the individual PMT's are digitized and combined to generate x and y spatial coordinates of the location of scintillation event on the crystal face.

There are, however, several problems associated with the multiplier tubes. They tend to drift, occupy a great deal of space, and are costly. Numerous proposals have been made to replace multiplier tubes with a pixilated solid-state array. As engineers and scientists started employing the solid-state devices to study nuclide distribution in a subject, they ran to yet another problem. The solid-state array generally includes approximately 15,000 pixels or more of 1 to 2 mm. It is difficult to manufacture an array this size without any dead or out of specification pixels. Moreover, in use over time, one or more pixels often become dead, degenerate, or otherwise fail to provide a correct data in response to a radiation event. Pixels that do not generate correct data cause artifacts in the reconstructed image.

The present invention contemplates a new and improved method and apparatus which overcomes the above-referenced problem and others.

In accordance with one aspect of the present invention, a radiation detecting apparatus is provided. An array of elements converts individual received radiation events into corresponding radiation event signals. One of the radiation converting elements is defective. A means digitizes the radiation events. A means generates radiation event signals for the defective radiation converting element based on the radiation event signals from the other radiation converting elements of the array.

In accordance with another aspect of the present invention, a method of detecting radiation is provided. Radiation events are received at an array of pixilated locations and corresponding radiation event signals are generated. At least one of the locations is defective. The radiation event signals from the non-defective locations are digitized. Radiation event signals for the defective location are generated based on the radiation event signals from the non-defective locations.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not be construed as limiting the invention.

Figure 1:
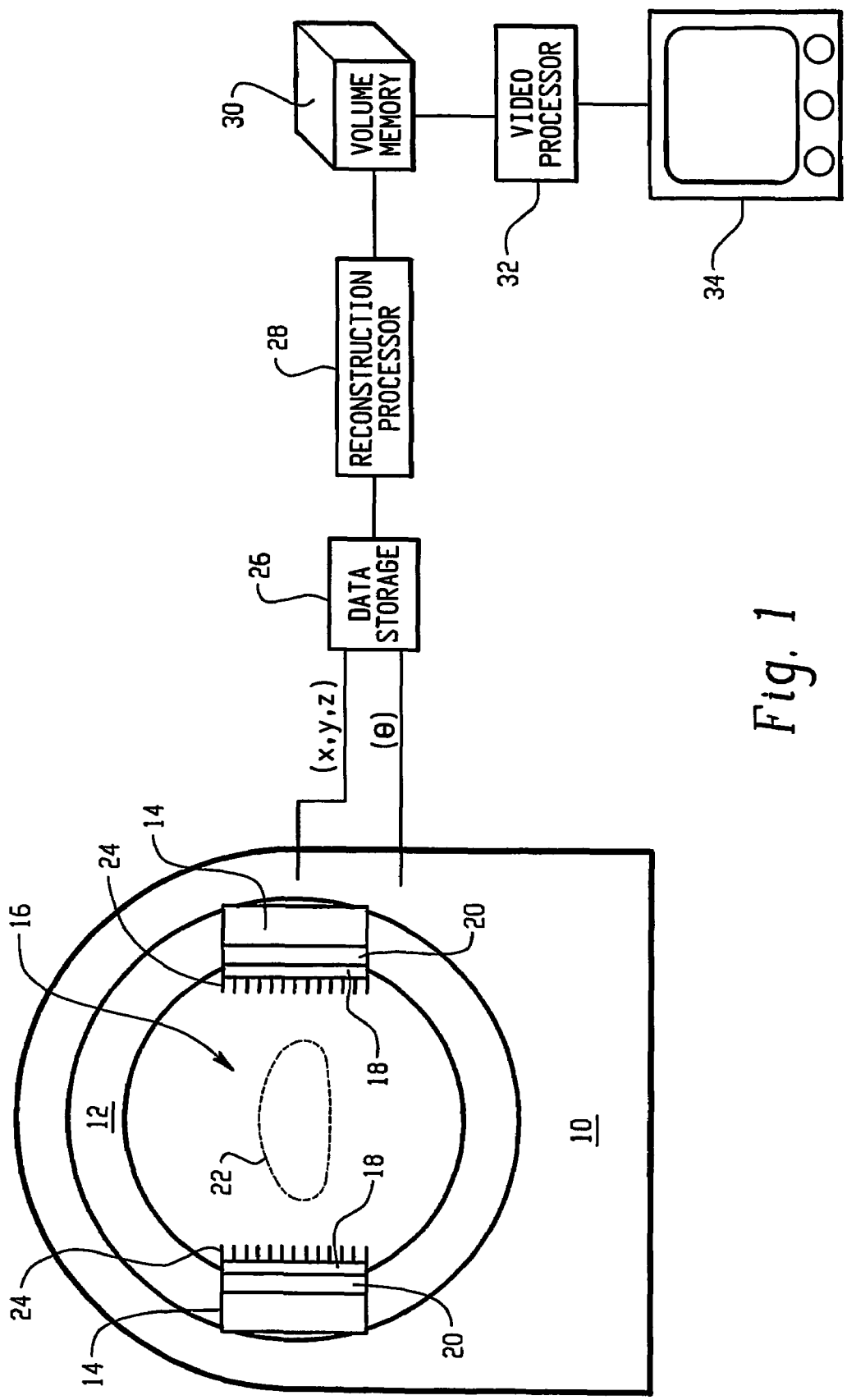
FIG. 1 is a diagrammatic illustration of a nuclear digital imaging device in accordance with the present invention.

With reference to FIG. 1, a nuclear imaging device typically includes a stationary gantry 10 that supports a rotating gantry 12. One or more detector heads 14 are carried by the rotating gantry to detect radiation events emanating from a region of interest 16. Each detector head includes a two-dimensional array 18 of detector elements. The detector arrays are preferably solid-state detectors, which convert gamma radiation directly into electrical charge. However, other arrays, such as an array of scintillators optically coupled with an array of photodiodes, or the like are also contemplated. Each head includes circuitry 20 for converting each radiation response into a digital signal indicative of its location (x, y) on the detector face and its energy (z).

Typically, an object 22 to be imaged is injected with one or more radiopharmaceutical or radioisotopes and placed in the examination region 16. The presence of these pharmaceuticals within the object 22 produces emission radiation from the object. Radiation traveling along a trajectory defined by a collimator 24 is detected by the detector heads 14. The detector heads are angularly indexed or rotated around the examination region to collect the emission data from a plurality of directions. The projection emission data (x, y, z) and an angular position (θ) of the detector head around the examination region are stored in a data storage 26. A reconstruction processor 28 processes the event and detector orientation data from the data storage 26 into a volumetric image representation. The image representation is then stored at a volume image memory 30 for manipulation by a video processor 32 and display on an image display 34 such as a video monitor, printer, or the like.

Figure 2:
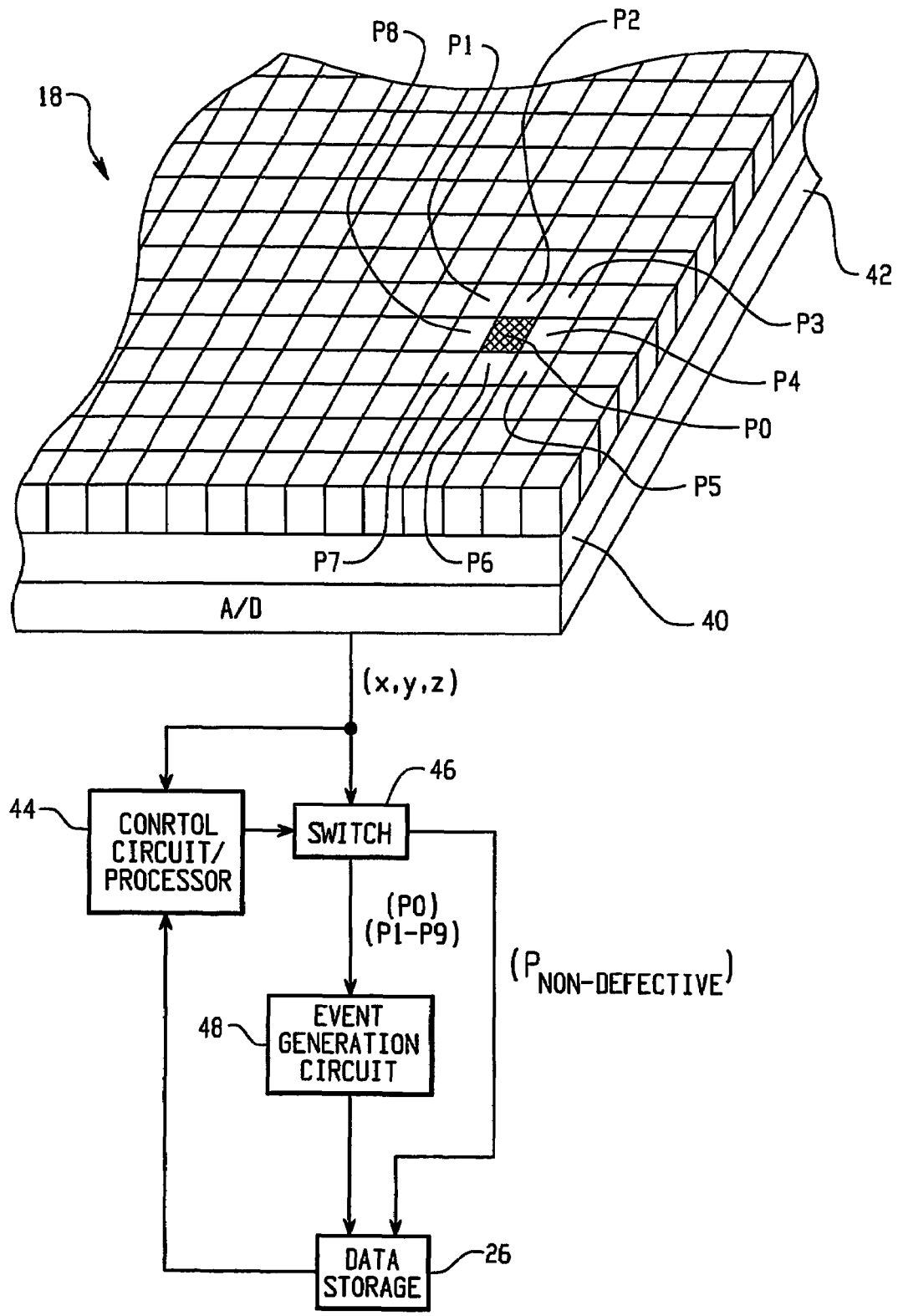
FIG. 2 is a diagrammatic illustration of the radiation event signal generating circuitry.

With reference to FIG. 2, the circuitry 20 optionally includes an array 40 of signal processing circuitry for amplifying, or otherwise processing the output of each detector element of the array 18. An array 42 of analog-to-digital converters convert each event to a digital signal indicative of an (x,y) position on the detector face and which digitizes a pulse amplitude to provide an energy signal (z).

During a precalibration operation, the detector face is irradiated with a uniform flood field. With a uniform flood of radiation, all detectors of the array should have the same number of counts and the events should be of consistent amplitude. A control circuit or processor 44 monitors the output of each detector element, either directly or by reading the data storage 26 to see if each has substantially the same number of counts and substantially the same energy distribution. If any of the detectors differ from the others by more than a preselected deviation, the control processor 44 causes a switching means 46 to delete signals form the malfunctioning elements or causes the preamplifiers 40 to disconnect the malfunctioning elements (e.g., pixel P0) from the analog-to-digital converter 42. The control processor 44 also causes the outputs of a plurality of nearest neighbors or other contributing pixels (e.g., pixels P1-P8) to be sent both to data storage 26 and an event generation circuit 48. The output of the event generation circuit 48 is connected with the data data storage 26 to supply (x, y, z) radiation events for the malfunctioning elements in accordance with events received by the contributing pixels.

Figures 3, 4, 5:
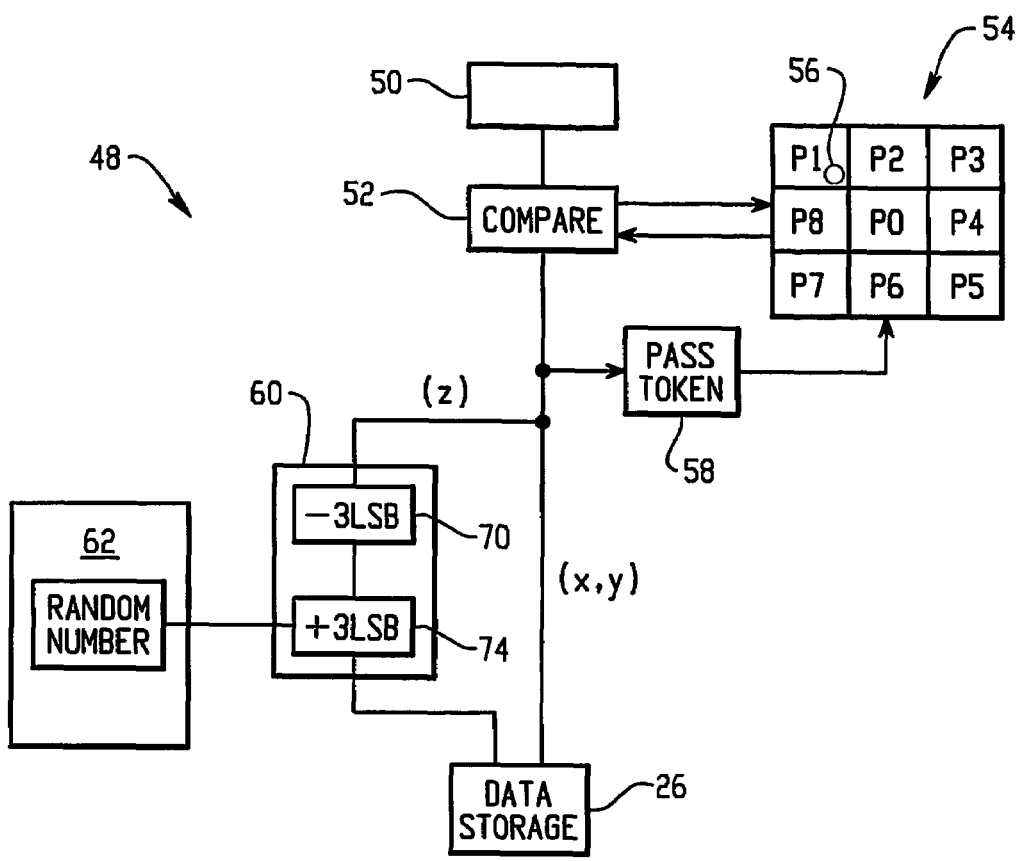
FIG. 3 illustrates a technique for generating radiation event signals for defective pixels.
FIG. 4 illustrates an alternative embodiment of the random event generating technique; and, FIG. 5 illustrates a technique for generating radiation event signals for a pair of side-by-side defective pixels.

With reference to FIG. 3, the event generator 48 of the preferred embodiment includes an input 50 in which events from each contributing pixel, e.g., the nearest neighbor pixels (P1-P8) are received. Each time an event is received on one of the contributing pixel inputs, a look-up and compare circuit 52 looks at a corresponding pixel table 54 and determines whether the contributing pixel at which an event occurred corresponds to a table position which has a token 56. By way of example, if the token 56 is in table position P1 corresponding to nearest neighbor P1, then when an input event is received from the pixel P1, the look-up and compare circuit 52 produces an output indicative of a received event at position P0. The back-up and compare circuit 52 further enables a token passing control circuit 58 to cause the table location P1 to pass the token to one of table locations P2-P8 corresponding to the other contributing pixels. Although the token may be passed among the table locations in order, it is preferred that it be passed randomly such as by random number generator 62. In this manner, if there are eight contributing pixels, approximately $\frac{1}{8}^{th}$ of the events occurring at each of the contributing pixels will be credited not only to the contributing pixel location, but also to the location of the defective pixel.

In one embodiment, the energy of the contributing pixel event is passed to the data memory as the energy of the event at P0. However, it is preferred that an energy circuit 60 replace the actual energy of the shared event with an average expected energy of the injected radioisotope. More specifically, the energy of the events is generally distributed over a bell-shaped curve. A dither circuit 60 preferably oscillates the energy along the bell-shaped curve to create a more typical energy distribution. In one embodiment, the dithering circuit 60 deletes 70 the least significant bits of the energy value from the contributing pixel, e.g., the three least significant bits. The dithering circuit 60 includes a random number generator 72 for generating random values for the detected least significant bits which replace 74 the deleted bits.

With reference to FIG. 4, it is to be appreciated that the contributing pixels need not be the eight nearest neighboring pixels. In the example of FIG. 4, the contributing pixels include the 24 nearest neighboring pixels. More preferably, the token passing circuit 58 passes the token based on proximity of the contributing pixels. The randomness of the token passing algorithm is selected such that the nearest neighbors P1-P8 receive the token to four times as often as the next most nearest neighbors P9-P24. In another alternate embodiment, the pixels P9, P13, P17 and P21 at the corners of the matrix are not used as contributing pixels or contribute even less frequently. In yet another alternate embodiment, only the pixels in a plus-shaped array contribute, i.e., P11, P2, P6, P19 and P22, P8, P4, and P15 in the numbering scheme of FIG. 4. In yet another alternate embodiment, only a column, row, or diagonal row of pixels contribute. Various other arrangements of contributing pixels may be selected as may be appropriate to chose pixels that produce approximately the same amount of output as would be expected from the defective pixel.

In some instances, two defective pixels P0 may occur side by side as illustrated in FIG. 5 or corner to corner. In the embodiment of FIG. 5, the nearest neighbor pixels P1-P10 surrounding the pair are selected as the contributing pixels. The data is processed substantially the same as in FIG. 3, except that there are two tokens. One token corresponds to each of the two defective pixels. Whenever an input is received from a contributing pixel corresponding to the table location that holds the token for one of the pixels, an event is generated for that pixel and the token is passed.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A radiation detecting apparatus comprising:
    an array of elements for converting individual received radiation events into corresponding radiation event signals, one of the radiation converting elements being defective;
    a means for digitizing the radiation event signals from at least non-defective elements; and
    a virtual event generator which generates radiation event signals for the defective radiation converting element based on the radiation event signals from other radiation converting elements of the array by:
        assigning at least two of the individual radiation converting elements of the array as contributing elements,
        selecting a selected one of the contributing elements,
        each time the selected contributing element receives a radiation event, generating both an event signal for the selected contributing elements and a event signal for the defective element,
        while radiation events are being received, randomly changing the selected contributing element.

2. The apparatus as set forth in claim 1 wherein the radiation converting elements each include one of:
    solid state detector elements, and
    a scintillation crystal and photodiode pair.

3. The apparatus as set forth in claim 1, further including:
    a means for assigning a radiation energy value to the generated radiation event signals for the defective element.

4. The apparatus as set forth in claim 3, further including:
    a means for varying the energy output of the energy output means over a preselected limited range.

5. The apparatus as set forth in claim 4, wherein the energy varying means includes:
    a means for removing a preselected number of least significant bits of the energy value;
    a random number generator for randomly generating least significant bits;
    a means for replacing the removed least significant bits with the randomly generated least significant bits.

6. The apparatus as set forth in claim 1, further including:
    a means for reconstructing radiation event information into an image representation;
    a means for storing the image representation;
    a means for converting at least a portion of the image representation into a human readable display.

7. A radiation detecting apparatus comprising:
an array of elements for converting individual received radiation events into corresponding radiation event signals, one of the radiation converting defective;
a means for digitizing the radiation event signals from at least non-defective elements;
a means for assigning at least two of the individual radiation converting elements of the array as contributing pixels whose output signals are supplied to the defective pixel output signal generating means;
a means for generating a radiation event signal for the defective radiation converting element based on the radiation event signals from the contributing pixels, the defective pixel output signal generating means including:
a table having a position for each of the contributing pixels;
a means for passing a token among the table positions;
a means for receiving the radiation event signals from the contributing radiation converting elements and accessing the table to determine whether the corresponding table position holds the token, in response to the corresponding table position holding the token, generating the radiation event signal for the defective radiation converting element and causing the token passing means to pass the token.

8. The apparatus as set forth in claim 7, wherein two adjacent radiation converting elements are defective and further including:
two tokens, one corresponding to each of the defective radiation event converting element which the token passing means passes among the table positions.

9. A gamma camera comprising:
a two-dimensional array of radiation detector elements which receives incident gamma radiation events and produces corresponding output signals, one of the radiation detector elements being defective;
at least one analog-to-digital converter for converting the element output signals into a digital value indicative of spatial location on the array and energy of the incident gamma radiation event; and
a virtual event generator which;
receives the output signals from contributing radiation detecting elements of the array,
determines whether the contributing radiation detecting elements are randomly assigned a token, and
generates digital output signals for the defective radiation detecting element based on the output signals from contributing radiation detecting elements of the array which hold the token.

10. A method of detecting radiation comprising:
receiving radiation events at an array of pixel locations and generating corresponding radiation event signals, at least one of the locations being defective;
digitizing the radiation event signals from non-defective pixel locations;
awarding a token to at least one of the non-defective pixel location adjacent to the defective pixel location:
in response to receiving a radiation event signal corresponding to the non-defective pixel location with the token, generating radiation event signals for the defective pixel location based on the radiation event signals from the at least one non-defective locations with the token and transferring the token to another non-defective pixel location adjacent to the defective pixel location.

11. The method as set forth in claim 10, further including:
irradiating the pixel locations with a flood field of gamma radiation;
monitoring at least one of the radiation event signals to determine the defective pixel locations.

12. The method as set forth in claim 10,
wherein two adjacent pixel locations are defective, the token awarding step further including:
awarding two tokens, one token corresponding to each defective pixel locations, which tokens are passed independently.

13. The method as set forth in claim 10, for each defective pixel location, determining nearest neighbors pixel locations and next nearest neighbor pixel locations and wherein the token passing step includes:
passing the token among the nearest neighbor pixel locations with a higher frequency than passing the token among the next nearest neighbor pixel locations.

14. The method as set forth in claim 10, wherein the radiation event signals are indicative of location and an energy of the received radiation event and further including:
randomly varying digital energy values corresponding to the defective pixel locations.

15. The method as set forth in claim 14, further including:
removing least significant bits of the digital energy value of the radiation event at the non-defective pixel location; and,
assigning randomly generated values as the least significant bits.

16. The method as set forth in claim 10 wherein the digitized event signal includes array position values indicative of the location in the array that the radiation event was received, and further including:
reconstructing the digital position values into a three-dimensional image representation; and
converting portions of the image representation into a human readable display.

17. An imaging apparatus comprising:
a detector including an array of detector elements for converting radiation events into corresponding radiation event signals;
a means for determining defective detector elements of the array;
a means for assigning detector elements proximate to each defective element as contributing detector elements whose outputs form the basis of the generating of the radiation event signal for the defective detector elements: and a means for generating radiation event signals for defective detector elements in response to receivng a radiation event signal corresponding to, a randomly selected contributing detector element, the selected contributing elements changing randomly.

* * * * *